United States Patent [19]
Bastian et al.

[11] 3,903,111
[45] Sept. 2, 1975

[54] 4-[3-PHENYL-PYRROLIDIN-1-YL]-BUTYROPHENONE DERIVATIVES

[75] Inventors: Jean-Michel Bastian, Therwil; Klaus Hasspacher, Riehen; Michael Strasser, Ziegelhofen, all of Switzerland

[73] Assignee: Sandoz Ltd., Basel, Switzerland

[22] Filed: Sept. 6, 1973

[21] Appl. No.: 394,685

[30] Foreign Application Priority Data
Sept. 11, 1972 Switzerland.................. 13280/72
Nov. 21, 1972 Switzerland.................. 16930/72

[52] U.S. Cl................... 260/326.47; 260/326.5 D; 260/326.5 J; 424/274
[51] Int. Cl............................. C07d 27/04
[58] Field of Search.................. 260/326.5 J, 326.47

[56] References Cited
UNITED STATES PATENTS
3,462,452  8/1969  Cavalla ............................. 260/326.5

*Primary Examiner*—Joseph A. Narcavage
*Attorney, Agent, or Firm*—Gerald D. Sharkin; Robert S. Honor

[57] ABSTRACT

The present invention concerns novel compounds of formula I,

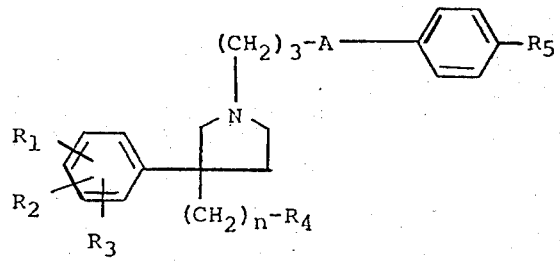

wherein
$R_1$ is hydrogen, lower alkyl, halogen or lower alkoxy, and
$R_2$ is hydrogen, lower alkyl, chlorine or lower alkoxy, or
$R_1$ and $R_2$ together are methylenedioxy,
$R_3$ is hydrogen, lower alkyl or lower alkoxy,
$n$ is 1 or 2,
$R_4$ is hydroxyl, lower alkoxy, lower alkylcarboxy, or, when $n$ is 1, alternatively lower monoalkylcarbamoyloxy,
$R_5$ is hydrogen, fluorine or chlorine, and
A is carbonyl, 1,3-dioxolan-2-ylidene or 1,3-dioxan-2-ylidene, useful as analgesic agents.

40 Claims, No Drawings

4-[3-PHENYL-PYRROLIDIN-1-YL]-BUTYROPHENONE DERIVATIVES

The present invention relates to new 4-[3-phenyl-pyrrolidin-1-yl-butyrophenone derivatives.

The present invention provides compounds of formula I,

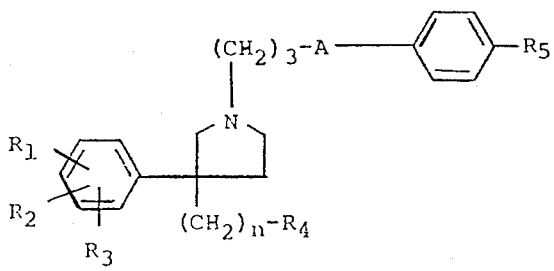

I wherein
$R_1$ is hydrogen, lower alkyl, halogen of atomic number from 9 to 35, or lower alkoxy, and
$R_2$ is hydrogen, lower alkyl, chlorine or lower alkoxy, or
$R_1$ and $R_2$ together are methylenedioxy,
$R_3$ is hydrogen, lower alkyl or lower alkoxy,
$n$ is 1 or 2,
$R_4$ is hydroxyl, lower alkoxy, lower alkylcarboxyl, or, when $n$ is 1, alternatively lower monoalkylcarbamoyloxy,
$R_5$ is hydrogen, fluorine or chlorine, and
A is carbonyl, 1,3-dioxolan-2-ylidene or 1,3-dioxan-2-ylidene.

The present invention provides a process for the production of a compound of formula I, comprising
a. reacting a compound of formula II,

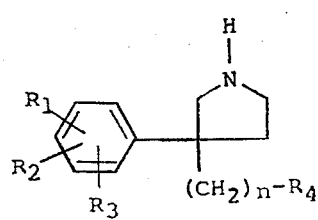

II wherein $R_1$, $R_2$, $R_3$, $R_4$ and n are as defined above, with a compound of formula III,

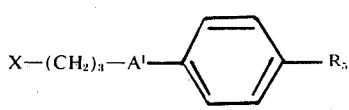

III wherein $R_5$ is as defined above,
$A'$ is carbonyl in free form or in ketal protected form, and
X is chlorine, bromine, iodine or an organic sulphonic acid radical,
and removing the protective radical from any resulting compound of formula Ia,

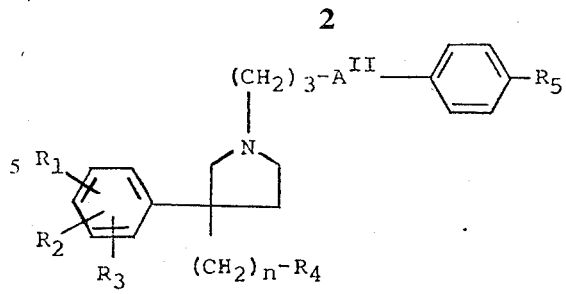

Ia wherein $R_1$, $R_2$, $R_3$, $R_4$, $R_5$ and n are as defined above, and
$A''$ is carbonyl in ketal protected form, other than 1,3-dioxolan-2-ylidene or 1,3-dioxan-2-ylidene,
b. producing a compound of formula Ib,

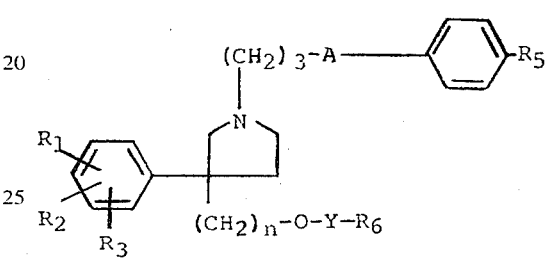

Ib wherein
$R_1$, $R_2$, $R_3$, $R_5$, n and A are as defined above,
$R_6$ is lower alkyl, and
Y is —CO—, or, when $n$ is 1, alternatively —CO—NH—,
by reacting a compound of formula Ic,

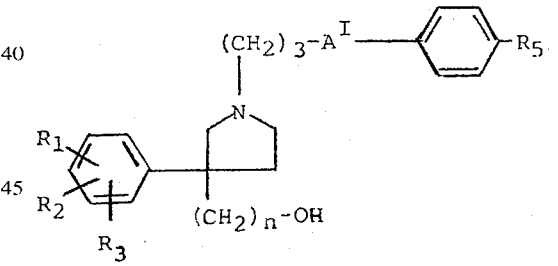

Ic wherein $R_1$, $R_2$, $R_3$, $R_5$, n and $A'$ are as defined above, with a compound of formula IV,

IV wherein
$R_6$ is as defined above, and
$Y'$ is $X'$—CO—, wherein $X'$ is chlorine, bromine or an acid radical of a lower carboxylic acid, or, when $n$ in the compound of formula Ic is 1, $Y'$ is alternatively OCN-,
and removing the protective radical from any resulting compound of formula Id,

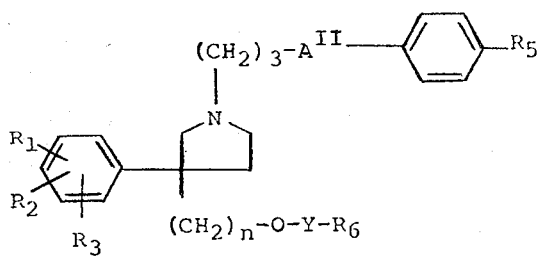

Id wherein $R_1$, $R_2$, $R_3$, $R_5$, $R_6$, n, $A''$ and Y are as defined above, or c. producing a compound of formula Ie,

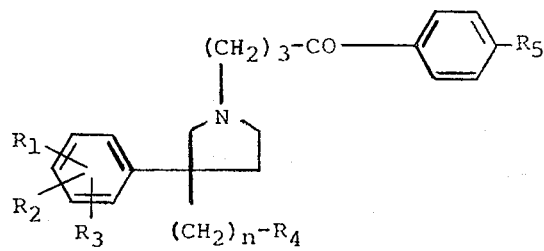

Ie wherein $R_1$, $R_2$, $R_3$, $R_4$, $R_5$ and $n$ are as defined above, by oxidizing a compound of formula V,

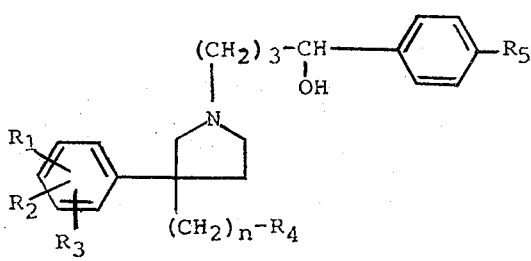

V wherein $R_1$, $R_2$, $R_3$, $R_4$, $R_5$ and $n$ are as defined above, or d. producing a compound of formula Ig,

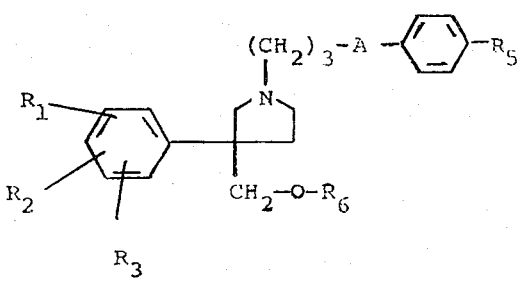

Ig wherein $R_1$, $R_2$, $R_3$, $R_5$, $R_6$ and A are as defined above, by etherifying a compound of formula Ih,

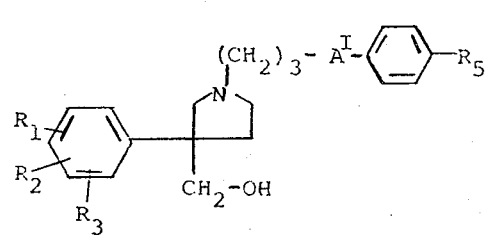

Ih wherein $R_1$, $R_2$, $R_3$, $R_5$ and $A'$ are as defined above, and removing the carbonyl protective radical from any compound of formula Ia, wherein $R_4$ is $-OR_6$ as defined above, or e. removing the carbonyl protective radical from a compound of formula If, If wherein $R_1$, $R_2$, $R_3$, $R_4$, $R_5$ and $n$ are as defined above, and $A'''$ is carbonyl in ketal protected form, to produce a compound of formula Ie.

The substituents $R_1$ and $R_2$ preferably are hydrogen or chlorine. The substituent $R_3$ preferably is hydrogen.

The lower alkyl or alkoxy groups represented by $R_1$, $R_2$ and $R_3$ preferably have 1 to 3 carbon atoms and especially are methyl or methoxy respectively. $R_4$ preferably is hydroxyl or alkylcarboxy. $R_6$ preferably has 1 to 4 carbon atoms when lower alkyl, or in the radical $-O-Y-R_6$ which is a significance of $R_4$. When $R_4$ is alkoxy, this preferably has 1 to 3 carbon atoms and especially is methoxy. $R_5$ preferably may be chlorine or bromine but most preferably is fluorine. A preferably is carbonyl, and n preferably is 2.

When the term "lower" as used herein to refer to a carbon-containing radical, but is not particularly defined, this refers to preferably up to 4 carbon atoms, and more preferably up to 3 carbon atoms.

Process variant (a) may be effected as follows:-

The reaction may be effected in an inert organic solvent. Examples of suitable inert solvents are aromatic hydrocarbon solvents such as benzene or toluene, halogenated hydrocarbon solvents such as chloroform, cyclic ether solvents such as tetrahydrofuran or dioxane, and lower alcohol solvents such as ethanol, and aprotic solvents such as dimethyl formamide or acetone. The reaction is preferably effected at an elevated temperature conveniently from 50° to 150°. The reaction is preferably effected in the presence of an acid-binding agent, e.g. an alkali metal carbonate as sodium or potassium carbonate, or an organic base such as pyridine or triethylamine.

Examples of suitable protective radicals for the carbonyl function are ketals which may be split off at low temperatures, preferably at a temperature of below 25°, especially from 0° to 25°. The reaction is effected preferably in the presence of other than highly concentrated acids. Examples of protected forms of the carbonyl group are ketals of lower alkyl mono- or di-alcohols. Different mono-alcohols may be used to produce mixed ketals. However, it is preferred to use cyclic ketals, having 5 to 6 ring members, especially dioxolan-2-ylidene. The removal of the protective group after the reaction is complete, may be effected from the resulting, conveniently crude, ketals in known manner, e.g. by hydrolysis with a dilute mineral acid, e.g. with from 20 percent to 2 N, hydrochloric acid. When $R_4$ in the compounds of formula I contains an ester group, the reaction conditions for the ketal splitting should be chosen to avoid a simultaneous ester splitting in $R_4$. Similar considerations apply to process variant (e).

The process variant (b) may be carried out under conventional reaction conditions for esterification or for carbamate formation, e.g. a compound of formula Ic may be reacted with an acid anhydride or halide of formula IVa, $$R_6\text{-CO-}X'$$

wherein $R_6$ and $X'$ are as defined above, or with an alkyl isocyanate of formula IVb, $$R_6\text{-NCO}$$
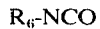

wherein $R_6$ is as defined above.

The reaction temperature may be from about 10° to 80°C. If desired the reaction may be effected in an inert organic solvent, e.g. an aromatic hydrocarbon solvent such as benzene or toluene, or a cyclic ether solvent such as dioxane or tetrahydrofuran, or a halogenated hydrocarbon solvent such as methylene chloride or chloroform. The esterification of a compound of formula Ic with a compound of formula IVa may conveniently be effected in the presence of an acid-binding agent, e.g. an alkali metal carbonate, for example sodium or potassium carbonate, or an organic base such as pyridine or triethylamine. An excess of organic base in liquid form may simultaneously serve as solvent.

Process variant (c) may be effected in conventional manner for the production of ketones from alcohols by oxidation. Representative oxidizing agents are, for example, inorganic oxidizing agents, e.g. manganese dioxide or chromic acid, or a chromate in the presence of an acid, e.g. dichromate. A preferred oxidizing system is the Oppenauer system, i.e. a ketone or aldehyde in the presence of an aluminium alcoholate as oxidizing agent, e.g. acetone and aluminium isopropylate.

Alternatively dimethyl sulphoxide may be used. Other suitable oxidizing agents are hydrogen peroxide and peracids. The oxidation reaction may be effected in an inert solvent. Examples of suitable solvents for the oxidation in an anhydrous medium are: hydrocarbon solvents such as petroleum ether, halogenated hydrocarbon solvents such as carbon tetrachloride or chloroform, and aromatic solvents such as benzene, or acetone or pyridine.

When an inorganic oxidizing agent is used, the reaction is preferably effected in an aqueous medium, conveniently in the presence of a watermiscible organic solvent, e.g. acetone or acetic acid.

When $R_1$ in the compound of formula V is hydroxyl, the oxidizing conditions must be so chosen that only the benzyl alcohol group is affected. It is preferred to use stoichiometric amounts or a slight excess, of oxidizing agent and to effect the reaction at a low temperature, e.g. at room temperature. Suitable mild oxidizing methods for the selective oxidation of the secondary benzyl group are especially the Oppenauer system, dimethyl sulphoxide or chromate in pyridine.

Process variant (d) may be carried out in accordance with conventional methods for etherification of alcohols under mild conditions. In accordance with a preferred method of effecting the process of a compound of formula Ih is converted, for example, into a sulphonic acid ester, which is reacted in known manner with a metal alcoholate. The latter reaction is conveniently effected at an elevated temperature, e.g. at from about 50° to 150°C, preferably from 90° to 100°C. The reaction is conveniently effected in an inert solvent, preferably dimethyl sulphoxide or dimethyl formamide.

The preferred sulphonic acid esters of the compounds of formula Ih are the lower alkylsulphonic acid esters, preferably 1 to 6 carbon atoms, especially methylsulphonic acid esters or arylsulphonic acid esters, preferably of 6 to 10 carbon atoms, especially benzene or p-toluenesulphonic acid ester. For the conversion into their sulphonic acid esters, the compounds of formula Ih may be esterified in conventional manner with a sulphonic acid halide. The esterification reaction is conveniently effected in an inert organic solvent preferably an aprotic solvent such as dimethyl formamide. The esterification reaction is preferably effected in the presence of a preferably organic base, such as pyridine. The etherification reaction temperature conveniently is from 0° to 50°C.

The starting materials may, for example, be obtained as follows:

a'. A compound of formula IIa,

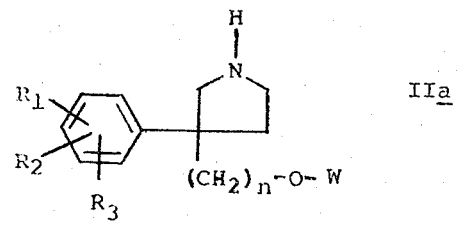

wherein
$R_1$, $R_2$, $R_3$ and $n$ are as defined above, and
W is $-Y-R_6$, or, when n is 1, W is $R_6$, wherein $R_6$ is lower alkyl, and Y is $-CO-$, or, when $n$ is 1, alternatively $-CO-NH-$, which is a starting material for process variant (a) may, for example, be obtained by benzylating in known manner a compound of formula IIb,

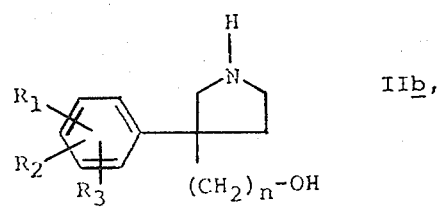

wherein $R_1$, $R_2$, $R_3$ and n are as defined above, to produce a compound of formula VI,

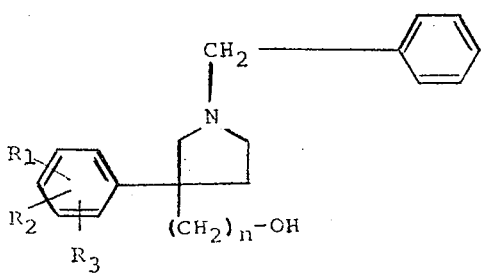

VI wherein $R_1$, $R_2$, $R_3$ and $n$ are as defined above,

The compound of formula VI may then be reacted with a compound of IV under reaction conditions analogous to those described with reference to process variant (b) and the resulting compound debenzylated in conventional manner ti produce a compound of formula IIA wherein W is —Y—$R_6$.

Alternatively the compound of formula VI may be etherified under reaction conditions analogous to those described with reference to process variant (d) and the resulting compound debenzylated in conventional manner to produce a compound of formula IIa wherein W is $R_6$. The benzyl group may be removed conveniently by hydrogenolysis.

The benzylation of a compound of formula IIb may be effected in known manner, e.g. by reacting with a molar amount of a benzyl halide, in an inert solvent, e.g. an aromatic hydrocarbon solvent such as benzene or toluene, an aprotic solvent such as dimethylformamide, or a halogenated hydrocarbon solvent such as chloroform, conveniently in the presence of an acid-binding agent, e.g. sodium carbonate.

b'. A compound of formula IIc

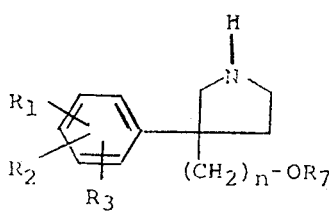

IIc wherein $R_1$, $R_2$, $R_3$ and $n$ are as defined above, and $R_7$ is hydrogen, or when $n$ is 2, also denotes lower alkyl, which is a starting material for process variant (a) may, for example, be obtained by reducing a compound of formula VII,

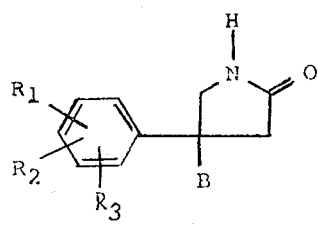

VII wherein $R_1$, $R_2$ and $R_3$ are as defined above, and

B is —$(CH_2)_{n-1}$—$COOR_8$, wherein $n$ is as defined above, and $R_8$ is lower alkyl, or —$(CH_2)_2$—OH, or —$(CH_2)_2$—$OR_6$, wherein $R_6$ is as defined above. $R_7$ and $R_8$ are preferably of 1 to 3 carbon atoms, especially ethyl. The reduction may, for example, be effected with metalloid or metal hydrides or complex metalloid or metal hydrides which are suitable for the reduction of esters and amides. Examples of suitable metal hydrides are aluminum hydride and complex aluminium hydrides such as lithium aluminum hydride, diisobutyl aluminum hydride, trialkoxylithium aluminum hydrides, sodium dihydro-bis-(2-methoxyethoxy)aluminate or diborane or complex borane hydrides such as lithium borohydride. The reaction may be effected in an inert solvent, e.g. an ether such as diethyl ether, tetrahydrofuran, dioxane or dimethoxyethane.

In place of a compound of formula VII it is also possible to use a corresponding compound benzylated on the nitrogen atom, in which case the resulting compound is subsequently debenzylated. In place of a compound of formula VII, wherein B is —$(CH_2)_{n-1}$—$COOR_8$, it is also possible to use the acids obtained therefrom by hydrolysis of the ester group, for example, by alkaline hydrolysis in conventional manner.

c'. A compound of formula VII may, for example, be obtained by hydrogenating a compound of formula VIII,

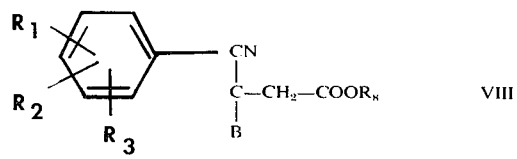

VIII wherein $R_1$, $R_2$, $R_3$, $R_8$ and B are as defined above, in the presence of a catalyst, with cyclization. Hydrogenation is preferably effected at a temperature from about 50° to 100°C especially 80°C, in an autoclave at about 70 to 95, e.g. 71 to 91, conveniently 81 atmospheres, of hydrogen pressure in the presence of an inert organic solvent, e.g. a lower alcohol solvent preferably of 1 to 4, e.g. 1 or 2, carbon atoms or a hydrocarbon solvent such as cyclohexane. An example of a suitable catalyst is Raney nickel.

d'. A compound of formula VIIIa,

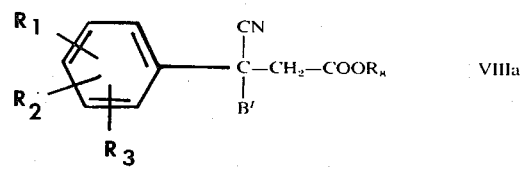

VIIIa wherein $R_1$, $R_2$, $R_3$ and $R_8$ are as defined above, and

B' is —$CH_2$—$COOR_8$, wherein $R_8$ is as defined above, —$(CH_2)_2$—OH or —$(CH_2)_2$—O—$R_6$, wherein $R_6$ is as defined above, may, for example, be produced by reacting a compound of formula IX,

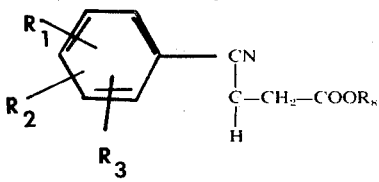

IX wherein $R_1$, $R_2$, $R_3$ and $R_K$ are as defined above, with a compound of formula X, $$X'' - B'$$

X wherein $B'$ is as defined above, and $X''$ is chlorine or preferably bromine, in the presence of a basic condensation agent, e.g. sodium amide or hydride, in an inert organic solvent, e.g. absolute diethyl ether, or toluene.

e'. A compound of formula IX may, for example, be obtained by reacting a compound of formula XI,

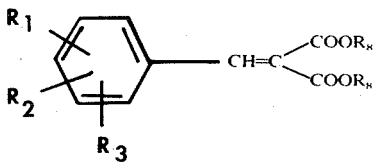

XI wherein $R_1$, $R_2$, $R_3$ and $R_K$ are as defined above, with a preferably alkali metal cyanide, especially potassium cyanide, conveniently in aqueous solution conveniently in the presence of a watermiscible inert organic solvent, e.g. a lower alcohol of formula XII, $$R_K - OH$$

XII wherein $R_K$ is as defined above, especially ethanol. The reaction is preferably effected at an elevated temperature, e.g. at a temperature between 40° and 100°C.

f'. A compound of formula XI may, for example, be obtained by reacting in known manner a compound of formula XIII,

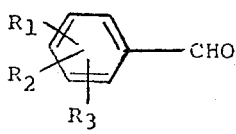

XIII wherein $R_1$, $R_2$ and $R_3$ are as defined above, with a malonic acid ester of formula XIV,

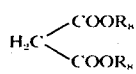

XIV g'. A compound of formula V used as starting material in process variant c) may, for example, be obtained by reacting a compound of formula II with a compound of formula XV,

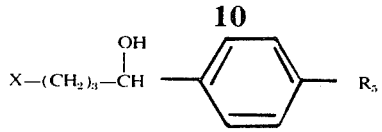

XV wherein $R_5$ and X are as defined above. The reaction may, for example, be effected under the reaction conditions indicated in process variant (a).

h'. A compound of formula VIIIb,

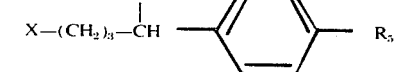

VIIIb wherein $R_1$, $R_2$, $R_3$ and $R_K$ are as defined above, which is used in process variant (c') may, for example, be obtained by reacting a compound of formula XVI,

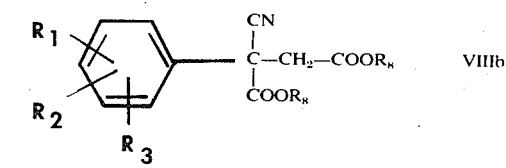

XVI wherein $R_1$, $R_2$, $R_3$ and $R_K$ are as defined above, with a compound of formula XVII, $$X'' - CH_2 - COOR_K$$

XVII wherein $X''$ and $R_K$ are as defined above, for example under the reaction conditions mentioned above with reference to process variant (d').

i. A compound of formula Ic, used as starting material for process variant (b) may be produced in accordance with process variant (a) wherein $R_4$ is hydroxy in a compound of formula II.

j'. A compound of formula Ih, used as starting material for process variant (d) may be produced in accordance with process variant (a) where n is 1 and $R_4$ is hydroxy in a compound of formula II.

Insofar as the production of the starting materials is not described, these compounds are known or may be produced in accordance with known processes or in a manner analogous to the processes described herein or to known processes.

The compounds of formula I may be isolated and purified in conventional manner. Where required free base forms of compounds of formula I may be converted into acid addition salt forms in conventional manner and vice versa.

Representative acids for acid addition salt formation include the organic acids, such as fumaric, 1,5-naphthalene-disulphonic, and maleic acids and the mineral acids such as the hydrohalic sulphuric and phosphoric acids.

The compounds of formula I have not been described in the literature.

The compounds of formula I are useful because they possess pharmacological activity in animals. In particular, the compounds of formula I are useful as analgesic agents for the relief of pain, as indicated by standard tests, for example, the hotplate test in mice on s.c. administration of 1 to 20 mg/kg animal body weight, of the compounds, and the phenylbenzoquinone syndrome test in mice on p.o. administration of 1.5 to 30 mg/kg animal body weight of the compounds.

For the above mentioned use the dosage will, of course, vary depending on the compound employed, mode of administration and therapy desired. However, in general, satisfactory results are obtained when administered at a daily dosage of from 0.5 mg to about 30 mg per kg animal body weight, conveniently given in divided doses 2 to 4 times a day or in sustained release form. For the larger mammal, the total daily dosage is in the range from about 30 to about 300 mg, and dosage forms suitable for oral administration comprise from about 7 mg to about 150 mg of the compounds admixed with a solid or liquid pharmaceutical carrier or diluent.

The compounds of formula I may be administered in pharmaceutically acceptable acid addition salt form. Such acid addition salt forms exhibit the same order of activity as the free base forms and are readily prepared in conventional manner. Representative acid addition salt forms include organic acid salt forms such as the hydrogen maleate, fumarate, tartrate and methane sulphonate and mineral acid salt forms such as the hydrochloride, hydrobromide and sulphate. A pharmaceutical composition may comprise a compound of formula I, in free base form or in pharmaceutically acceptable acid addition salt form, in association with a pharmaceutical carrier or diluent. Such compositions conveniently contain more than 1 percent by weight of the compound of formula I and may be prepared by conventional techniques to be in conventional forms, for example, capsules, tablets, suppositories, dispersible powders, syrups, elixirs, suspensions or solutions, for enteral or parenteral administration. Suitable pharmaceutical diluents or carriers include, for example, water, alcohols, natural or hardened oils and waxes, calcium and sodium carbonates, calcium phosphate, kaolin, talc and lactose as well as suitable preserving agents, such as ethyl-p-hydroxybenzoate, suspending agents such as methyl cellulose, tragacanth and sodium alginate, wetting agents such as lecithin, polyoxyethylene stearate and polyoxyethylene sorbitan monooleate, granulating and disintegrating agents such as starch and alginic acid, binding agents such as starch, gelatin and acacia, and lubricating agents such as magnesium stearate, stearic acid and talc, in order to provide an elegant and palatable pharmaceutical preparation. Compositions in tablet form may be coated by conventional techniques to delay disintegration of the tablet and absorption of the active ingredient in the gastrointestinal tract and thereby provide sustained action over a long period.

The preferred compositions from the standpoint of ease of administration are solid compositions, particularly solid-filled gelatin capsules and tablets. 4-[3-p-chlorophenyl-3-(2-hydroxyethyl)pyrrolidin-1-yl]-p-fluorobutyrophenone has especially interesting properties.

In one class of compounds
$R_1$ is hydrogen, alkyl, halogen especially fluorine or chlorine, or alkoxy,
$R_2$ is hydrogen, chlorine or alkoxy,
$R_1$ and $R_2$ together are methylene-dioxy,
$R_3$ is hydrogen or alkoxy and
A is carbonyl or 1,3-dioxolan-2-ylidene.

Preferably $R_2$ and $R_3$ are hydrogen. More preferably $R_2$ is in the para position and is especially chlorine or hydrogen.

Preferably n is 2 and $R_4$ is hydroxy.

Preferably A is carbonyl, especially with reference to process variant d ). $A^{III}$ is preferably 1,3-dioxolan-2-ylidene or 1,3-dioxan-2-ylidene.

In another class of compounds $R_5$ is preferably fluorine, preferably $R_1$ and $R_2$ are hydrogen or chlorine. $R_3$ preferably is hydrogen.

In another class of compounds $R_1$ and $R_2$ are together methylene-dioxy or methoxy and $R_3$ is hydrogen.

In another class of compounds $R_1$ is alkylcarboxy.

Any restriction of the significances $R_1$ to $R_5$, $n$ and A made or in combination with any restriction of some or all of the others of said significances may be combined with any other restriction of said significances mentioned above.

In the following non-limitative Examples all temperatures are indicated in degrees Centigrade. Ether refers to diethyl ether. Room temperature is from 10° to 30°.

EXAMPLE 1:

p-Fluoro-4-[3-(2-hydroxyethyl)-3-phenyl-1-pyrrolidinyl]butyrophenone [process variant a)]

6.6 g of 3-(2-hydroxyethyl)-3-phenylpyrrolidine and 7.0 g of 4-chloro-p-fluorobutyrophenone are heated at reflux with 6.5 g of sodium carbonate in 100 cc of toluene for 6 hours while stirring. Filtration is then effected, the solvent is removed by evaporation and the oily residue is taken up in 100 cc of 2N hydrochloric acid. The acid solution is washed twice with 50 cc amounts of chloroform, is then rendered alkaline with a 2N caustic soda solution while cooling and is extracted thrice with 50 cc amounts of chloroform. The extract is dried over sodium sulphate and concentrated by evaporation; the resulting crude title compound is converted into its 1,5-naphthalene-disulphonate form, M.P. 169° to 171° (from ethanol).

The starting material is obtained as follows:

a. 200 g of malonic acid diethyl ester, 144 g of benzaldehyde, 14 cc of piperidine and 11.7 g of benzoic acid in 400 cc of benzene are heated at reflux in a water separator (bath temperature 130° to 140°, separation of water approx. 25 cc) for 14 hours. After cooling, 200 cc of benzene are added and washing is successively effected twice with 200 cc amounts of water, twice with 200 cc amounts of 1N hydrochloric acid and with 100 cc of a saturated sodium bicarbonate solution, and the benzene is removed by distillation on a rotary evaporator. The resulting benzalmalonic acid diethyl ester is purified by distillation. B.P. 143° to 152° at 0.2 mm of Hg.

b. 120 g of benzalmalonic acid diethyl ester, 33.6 g of potassium cyanide, 1600 cc of ethanol and 160 cc of water are stirred at a bath temperature of 60° for 12 to 14 hours. Cooling is then effected with ice water, the potassium bicarbonate which crystallizes is filtered off, the filtrate is rendered neutral with approx. 15 cc of 1N hydrochloric acid, air is sucked through the solution with a water jet pump for 1 hour, the solvent is removed by distillation on a rotary evaporator, the oily residue is decomposed with 100 cc of water and is extracted 6 times with 250 cc amounts of ether. The 3-cyano-3-phenylpropionic acid ethyl ester, obtained after removing the ether by distillation, is purified by vacuum distillation. B.P. 125° to 130° at 0.15 mm of Hg.

c. 42 g of sodium amide suspended in 400 cc of absolute ether are added dropwise at room temperature to a solution of 158 g of 3-cyano-3-phenylpropionic acid ethyl ester and 144 g of bromoacetic acid ethyl ester in one litre of absolute ether. After the addition of about half of the suspension, the reaction solution turns light-brown coloured and commences to boil. After the dropwise addition is complete, the reaction solution is heated at reflux for 2 hours, is cooled, the excess sodium amide is decomposed by the careful dropwise addition of water, the ether solution is washed with 250 cc of 2N hydrochloric acid and with 250 cc of water and is concentrated by evaporation. The resulting 3-cyano-3-phenylglutaric acid diethyl ester is purified by vacuum distillation. B.P. 172° to 175° at 0.08 mm of Hg.

d. 45 g of Raney nickel are added to 254.2 g of 3-cyano-3-phenylglutaric acid diethyl ester in 1.5 litres of absolute methanol and hydrogenation is effected in a 5-litre autoclave for 30 hours at 80° and a hydrogen pressure of 81 atmospheres. After cooling, the catalyst is filtered off, the filtrate is concentrated on a rotary evaporator, the resulting light yellow oil is taken up in 1.5 litres of chloroform and washed with 25 cc of 2N hydrochloric acid, with 100 cc of a saturated sodium bicarbonate solution and with 100 cc of water. The 5-oxo-3-phenyl-3-pyrrolidineacetic acid ethyl ester, obtained after concentrating the chloroform phase, crystallizes upon scratching with ether. M.P. 49° to 51° (from ethyl acetate/petroleum ether).

e. 195 g of 5-oxo-3-phenyl-3-pyrrolidine-acetic acid ethyl ester are dissolved in a mixture of 200 cc of water, 47 g of sodium hydroxide and 750 cc of ethanol at room temperature while stirring. After standing for one hour at room temperature, the sodium salt form of 5-oxo-3-phenyl-3-pyrrolidineacetic acid crystallizes. It is dissolved in 600 cc of water and acidified with approx. 600 cc of 2N hydrochloric acid while cooling with ice, whereby 5-oxo-3-phenyl-3-pyrrolidine-acetic acid separates in crystalline form. M.P. 186° to 188° (from ethanol).

f. 18.5 g of 5-oxo-3-phenyl-3-pyrrolidine-acetic acid are reduced by heating with 9.5 g of lithium aluminium hydride in 600 cc of tetrahydrofuran to 3-(2-hydroxyethyl)-3-phenyl-pyrrolidine. M.P. 112° to 114° (from ethyl acetate/petroleum ether).

EXAMPLE 2:

4-(3-p-Chlorophenyl-3-hydroxymethyl-1-pyrrolidinyl)-p-fluorobutyrophenone [process variants a) and e)]

8.5 g of 3-p-chlorophenyl-3-hydroxymethylpyrrolidine, 11.2 g of 2-(3-chloropropyl)-2-(p-fluorophenyl)-1,3-dioxolane, 8.5 g of sodium carbonate and 0.1 g of sodium iodide are stirred at 120° in 60 cc of dimethyl formamide for 12 hours. Filtration is subsequently effected and the filtrate is concentrated by evaporation. The oily residue is stirred with 120 cc of 20 percent hydrochloric acid at 20° for one hour; the acid solution is washed with 50 cc of chloroform, is then rendered alkaline with a 2N caustic soda solution and is extracted twice with 50 cc amounts of chloroform. The crude title compound, obtained after concentrating the chloroform phase which has been dried over sodium sulphate, is converted into its naphthalene-1,5-disulphonate form. M.P. 200° to 202° (from ethanol).

The starting material can be obtained as follows:

a. A solution of 22.3 g of p-chloro-phenyl-cyanoacetic acid ester in 10 cc of toluene is first added dropwise to a suspension of 2.4 g of sodium hydride in 40 cc of toluene, while stirring, and 16.7 g of bromoacetic acid ethyl ester are subsequently added. The mixture is then heated at reflux for one hour, is filtered, and the solvent is removed by distillation. The resulting yellow oil is dissolved in one litre of cyclohexane and hydrogenation is effected with Raney nickel at 80° and a hydrogen pressure of 81 atmospheres for 15 hours. After cooling, the catalyst is filtered off, the filtrate is concentrated by evaporation and the resulting 3-carbethoxy-3-p-chlorophenyl-5-pyrrolidone is crystallized. M.P. 129° to 131° (from ethanol).

b. 6.6 g of 3-carbethoxy-3-p-chlorophenyl-5-pyrrolidone are reduced with 3.6 g of lithium aluminium hydride by heating in 150 cc of tetrahydrofuran to 3-p-chlorophenyl-3-hydroxymethyl-pyrrolidine which is converted into its hydrochloride form. M.P. 152°–154° (from ethanol/ether).

EXAMPLE 3:

4-[3-p-chlorophenyl-3-(2-hydroxyethyl)-pyrrolidin-1-yl]-p-fluorobutyrophenone [process variants a) and e)]

15.5 g of 3-[p-chlorophenyl-3-(2-hydroxyethyl)]pyrrolidine and 20.2 g of 2-(3-chloropropyl)-2-(p-fluorophenyl)-1,3'-dioxolane are stirred together with 15 g of sodium carbonate (anhydrous) in 200 cc of dimethyl formamide at 100° for 5 hours. Filtration and evaporation to dryness on a rotary evaporator are then effected. The resulting light brown oil is taken up in 100 cc of chloroform and is stirred together with 200 cc of 2N hydrochloric acid at room temperature for 1 ½ hours. The reaction solution is subsequently rendered alkaline with caustic soda solution and is repeatedly extracted with 100 cc amounts of chloroform. A solution of naphthalene-1,5-disulphonic acid in ethanol is added to the crude title compound obtained after concentrating the chloroform solutions which have been dried over sodium sulphate. The naphthalene-1,5-disulphonate form of the title compound has a M.P. of 195° to 197° after recrystallization from ethanol.

The starting material may be obtained as follows:

a. p-chlorobenzalmalonic acid diethyl ester, produced in a manner analogous to Example 1a), B.P. 135° to 142° at 0.2 mm of Hg.

b. 3-(p-chlorophenyl)-3-cyanopropionic acid ethyl ester, produced in a manner analogous to Example 1b), B.P. 141° to 145° at 0.3 mm of Hg.

c. 3-(p-chlorophenyl)-3-cyanoglutaric acid diethyl ester, produced in a manner analogous to Example 1c), B.P. 166° to 169° at 0.3 mm of Hg.

d. 3-(p-chlorophenyl)-5-oxo-3-pyrrolidine-acetic acid ethyl ester, produced in a manner analogous to Example 1d). The crude product is used for the reaction of below.

e. 3-(p-chlorophenyl)-5-oxo-3-pyrrolidine-acetic acid is produced in a manner analogous to Example 1e). The alkaline reaction solution is thoroughly shaken once with 100 cc of methylene chloride in order to remove the by-products of hydrogenation in reaction d) above. 750 cc of 2N hydrochloric acid is added and the mixture five times extracted with 150 cc amounts of methylene chloride, the methylene chloride phase is concentrated and 3-(p-chlorophenyl)-5-oxo-3-pyrrolidine-acetic acid is recrystallized from ethanol. M.P. 190° to 191°.

f. 3-p-chlorophenyl-3-(2-hydroxyethyl)pyrrolidine, produced in a manner analogous to Example 1f). The crude product is used for the next reaction as such.

The following compounds are also obtained in a manner analogous to that described in Example 1, 2 or 3, by reacting the corresponding compounds of formula II with 4-chloro-p-fluorobutyrophenone or 2-(3-chloropropyl)-2-(p-fluorophenyl)-1,3-dioxolane:

| Example No. | Compound | produced analogous Ex. | Physical constants Remarks |
|---|---|---|---|
| 4 | p-fluoro-4-(3-hydroxymethyl-3-phenyl-1-pyrrolidinyl)butyrophenone | 2 | M.P. of the hydrogen fumarate form: 149 to 151° |
| | Starting material: 3-hydroxymethyl-3-phenylpyrrolidine | 2a+b | M.P. 98 to 100° (from ethyl acetate) |
| 5 | p-fluoro-4-[3-(2-methoxyethyl)-3-phenyl-1-pyrrolidinyl]butyrophenone | 2 | M.P. of the naphthalene-1,5-disulphonate form: 179 to 181° |
| | Starting material: | | |
| | a) 3-cyano-5-methoxy-3-phenyl-valeric acid ethyl ester | 1c | B.P. 152 to 155° at 0.1 mm of Hg |
| | b) 3-(2-methoxyethyl)-5-oxo-3-phenyl-pyrrolidine | 1d | oily crude product |
| | c) 3-(2-methoxyethyl)-3-phenyl-pyrrolidine | 1f | B.P. 86° at 0.05 mm of Hg |
| 6 | p-fluoro-4-[3-(2-hydroxyethyl)-3-p-isopropylphenyl)-1-pyrrolidinyl]-butyrophenone | 3 | M.P. of the napthalene-1,5-disulphonate form: 148 to 149° (from ethanol) |
| | Starting material: | | |
| | a) 4-isopropylbenzalmalonic acid ethyl ester | 1a | B.P. 152 to 154° at 0.4 mm of Hg |
| | b) 3-cyano-3-(4-isopropylphenyl)-propionic acid ethyl ester | 1b | B.P. 146 to 149° at 0.1 mm of Hg |
| | c) 3-cyano-3-(4-isopropylphenyl)-glutaric acid diethyl ester | 1c | B.P. 166 to 190° at 0.2-0.4 mm of Hg |
| | d) 3-(4-isopropylphenyl)-5-oxo-3-pyrrolidine-acetic acid ethyl ester | 1d | Crude product is used as such for next reaction |
| | e) 3-(4-isopropylphenyl)-5-oxo-3-pyrrolidine-acetic acid | 3e | M.P. 175 to 178° |
| | f) 3-(2-hydroxyethyl)-3-(p-isopropylphenyl)pyrrolidine | 1f | Crude product is used as such for next reaction |
| 7 | p-fluoro-4-[3-(2-hydroxyethyl)-3-(m-methoxyphenyl)-1-pyrrolidinyl]-butyrophenone | 3 | M.P. of the naphthalene-1,5-disulphonate form: 169 to 171° (from ethanol) |
| | Starting material: | | |
| | a) m-methoxybenzalmalonic acid diethyl ester | 1a | B.P. 140 to 150° at 0.05 mm of Hg., M.P. 45° |
| | b) 3-cyano-3-(m-methoxyphenyl)-propionic acid ethyl ester | 1b | B.P. 140 to 150° at 0.3 mm of Hg |
| | c) 3-cyano-3-(m-methoxyphenyl)-glutaric acid diethyl ester | 1c | B.P. 163 to 168° at 0.2 mm of Hg |
| | d) 3-(m-methoxyphenyl)-5-oxo-3-pyrrolidine-acetic acid ethyl ester | 1d | oily crude product, used as such for next reaction |
| | e) 3-(m-methoxyphenyl)-5-oxo-3-pyrrolidine-acetic acid | 3e | M.P. 144 to 146° (from ethanol) |
| | f) 3-(2-hydroxyethyl)-3-(m-methoxyphenyl)pyrrolidine | 1f | crude product used as such for next reaction. |
| 8 | p-fluoro-4-[3-(2-hydroxyethyl)-3-(p-methoxyphenyl)-1-pyrrolidinyl]-butyrophenone | 3 | M.P. of the naphthalene-1,5-disulphonate form: 168 to 169° (from ethanol) |
| | Starting material: | | |
| | a) p-methoxybenzalmalonic acid diethyl ester | 1a | B.P. 145 to 160° at 0.5 mm of Hg |
| | b) 3-cyano-3-(p-methoxyphenyl)-propionic acid ethyl ester | 1b | B.P. 190 to 200° at 0.3 mm of Hg |
| | c) 3-cyano-3-(p-methoxyphenyl)-glutaric acid diethyl ester | 1c | M.P. 65 to 75° (from ether/petroleum ether) |
| | d) 3-(p-methoxyphenyl)-5-oxo-3-pyrrolidine-acetic acid ethyl ester | 1d | crude product used as such for next reaction |
| | e) 3-(p-methoxyphenyl)-5-oxo-3-pyrrolidine-acetic acid | 3e | M.P. 172 to 175° |
| | f) 3-(2-hydroxyethyl)-3-(p-methoxyphenyl)pyrrolidine | 1f | crude product used as such for next reaction |
| 9 | p-fluoro-4-[3-(2-hydroxyethyl)-3-(3,4-methylenedioxyphenyl)-1-pyrrolidinyl]butyrophenone | 3 | M.P. of the naphthalene-1,5-disulphonate form: 158 to 159° (from ethanol) |
| | Starting material: | | |
| | a) 3,4-methylenedioxybenzal-malonic acid diethyl ester | 1a | B.P. 196 to 204° at 0,7 mm of Hg |

| Example No. | Compound | produced analogous Ex. | Physical constants Remarks |
|---|---|---|---|
| | b) 3-cyano-3-(3,4-methylenedioxy-phenyl)propionic acid ethyl ester | 1b | B.P. 161 to 162° at 0.4 mm of Hg |
| | c) 3-cyano-3-(3,4-methylenedioxy-phenyl)glutaric acid diethyl ester | 1c | oily crude product, used as such for next reaction |
| | d) 3-(3,4-methylenedioxyphenyl)-5-oxo-3-pyrrolidine-acetic acid ethyl ester | 1d | crude product used as such for next reaction |
| | e) 3-(3,4-methylenedioxyphenyl)-5-oxo-3-pyrrolidine-acetic acid | 3e | M.P. 220 to 222° |
| | f) 3-(2-hydroxyethyl)-3-(3,4-methylenedioxyphenyl)pyrrolidine | 1f | crude product used as such for next reaction |
| 10 | p-fluoro-[3-(2-hydroxyethyl)-3-(2,4-dimethoxyphenyl)-1-pyrrolidinyl]-butyrophenone<br>Starting material: | 3 | M.P. of the naphthalene-1,5-disulphonate form: 170 to 172° (from ethanol) |
| | a) 2,4-dimethoxybenzalmalonic acid diethyl ester | 1a | B.P. 200 to 210° at 0.1 mm of Hg |
| | b) 3-cyano-3-(2,4-dimethoxyphenyl)-propionic acid ethyl ester | 1b | B.P. 212 to 217° at 0.5 mm of Hg |
| | c) 3-cyano-3-(2,4-dimethoxyphenyl)-glutaric acid diethyl ester | 1c | crude product used as such for next reaction |
| | d) 3-(2,4-dimethoxyphenyl)-5-oxo-3-pyrrolidine-acetic acid ethyl ester | 1d | crude product used as such for next reaction |
| | e) 3-(2,4-dimethoxyphenyl)-5-oxo-3-pyrrolidine acetic acid | 3e | M.P. 175 to 177° |
| | f) 3-(2-hydroxyethyl)-3-(2,4-dimethoxyphenyl)pyrrolidine | 1f | crude product used as such for next reaction |
| 11 | p-fluoro-4-[3-(p-fluorophenyl)-3-(2-hydroxyethyl)-1-pyrrolidinyl]-butyrophenone<br>Starting material: | 3 | M.P. of the naphthalene-1,5-disulphonate form: 184 to 185° (from ethanol) |
| | a) p-fluorobenzalmalonic acid diethyl ester | 1a | B.P. 149 to 153° at 0.9 mm of Hg |
| | b) 3-cyano-3-(p-fluorophenyl)-propionic acid ethyl ester | 1b | B.P. 146 to 160° at 0.5 mm of Hg |
| | c) 3-cyano-3-(p-fluorophenyl)-glutaric acid diethyl ester | 1c | M.P. 68 to 70° (from ether/petroleum ether) |
| | d) 3-(p-fluorophenyl)-5-oxo-3-pyrrolidine-acetic acid ethyl ester | 1d | oily crude product, used as such for next reaction |
| | e) 3-(p-fluorophenyl)-5-oxo-3-pyrrolidine-acetic acid | 3e | M.P. 174 to 176° |
| | f) 3-(p-fluorophenyl)-3-(2-hydroxyethyl)pyrrolidine | 1f | crude product used as such for next reaction |
| 12 | p-fluoro-4-[3-(2-hydroxyethyl)-3-(p-tolyl)-1-pyrrolidinyl]-butyrophenone<br>Starting material: | 3 | M.P. of the naphthalene-1,5-disulphonate form: 210 to 211° (from ethanol) |
| | a) m-methylbenzalmalonic acid diethyl ester | 1a | B.P. 135 to 140° at 0.4 mm of Hg |
| | b) 3-cyano-3-(m-tolyl)propionic acid ethyl ester | 1b | B.P. 143 to 148° at 0.1 mm of Hg |
| | c) 3-cyano-3-(m-tolyl)glutaric acid diethyl ester | 1c | B.P. 160 to 167° at 0.08 mm of Hg |
| | d) 5-oxo-3-(m-tolyl)-3-pyrrolidine-acetic acid ethyl ester | 1d | crude product used as such for next reaction |
| | e) 5-oxo-3-(m-tolyl)-3-pyrrolidine-acetic acid | 3e | M.P. 152 to 154° |
| | f) 3-(2-hydroxyethyl)-3-(p-tolyl)-pyrrolidine | 1f | crude product used as such for next reaction |
| 13 | 4-[3-p-chlorophenyl-3-(2-methoxy-ethyl)-1-pyrrolidinyl]-p-fluoro-butyrophenone<br>Starting material: | 2 | M.P. of the naphthalene-1,5-disulphonate form: 203 to 205° |
| | a) 3-p-chlorophenyl-3-cyano-5-methoxypentanoic acid ethyl ester | 1c | B.P. 132 to 134° at 0.02 mm of Hg |
| | b) 3-p-chlorophenyl-3-(2-methoxyethyl)-5-oxopyrrolidine | 1d | oily crude product |
| | c) 3-p-chlorophenyl-3-(2-methoxy-ethyl)pyrrolidine | 1f | B.P. 147 to 155° at 0.2 mm of Hg |
| 14 | p-fluoro-4-[3-(2-hydroxyethyl)-3-(3,4,5-trimethoxyphenyl)-1-pyrrolidinyl]butyrophenone | 3 | chromatographic purification on silica gel<br>Analysis: %C %H %F %N<br>calc.: 67.4 7.2 4.3 3.1<br>found: 67.9 7.1 3.9 3.0 |
| | Starting material:<br>a) 3,4,5-trimethoxybenzalmalonic acid ethyl ester | 1a | B.P. 184 to 185° at 0.3 mm of Hg |
| | b) 3-cyano-3-(3,4,5-trimethoxy-phenyl)propionic acid ethyl ester | 1b | B.P. 190 to 198° at 0.15 mm of Hg |
| | c) 3-cyano-3-(3,4,5-trimethoxy-phenyl)glutaric acid diethyl ester | 1c | crude product purified by recrystallization from petroleum ether. M.P. 68–70° |
| | d) 3-(3,4,5-trimethoxyphenyl)-5-oxo-3-pyrrolidine-acetic acid ethyl ester | 1d | crude product used as such for next reaction |
| | e) 3-(2-hydroxyethyl)-3-(3,4,5-tri-methoxyphenyl)pyrrolidine | 1f | crude product used as such for next reaction |
| 15 | p-fluoro-4-[3-(2-hydroxyethyl)-3-(3,4-dimethoxyphenyl)-1- | 3 | light yellow oil purified chromatographically on |

| Example No. | Compound | produced analogous Ex. | Physical constants Remarks |
|---|---|---|---|
| | pyrrolidinyl]butyrophenone | | silica gel (eluant: ether/petroleum ether 1 : 1)<br>Analysis:　%C　%H　%F　%N<br>calc.:　69.5　7.2　4.6　3.4<br>found:　69.7　7.1　4.2　3.4 |
| | Starting material:<br>a) 3,4-dimethoxybenzalmalonic acid diethyl ester | 1a | B.P. 182 to 185° at 0.3 mm of Hg |
| | b) 3-cyano-3-(3,4-dimethoxyphenyl)-propionic acid ethyl ester | 1b | B.P. 192 to 195° at 0.15 mm of Hg |
| | c) 3-cyano-3-(3,4-dimethoxyphenyl)-glutaric acid diethyl ester | 1c | B.P. 206 to 210° at 0.1 mm of Hg |
| | d) 3-(3,4-dimethoxyphenyl)-5-oxo-3-pyrrolidine-acetic acid ethyl ester | 1d | M.P. 122 to 124° (ether/petroleum ether) |
| | e) 3-(2-hydroxyethyl)-3-(3,4-dimethoxyphenyl)pyrrolidine | 1f | M.P. of the tris-hydrogen fumarate form: 105–108° (from ether/petroleum ether) |
| 16 | 4-[3-(3,4-dichlorophenyl)-3-(2-hydroxyethyl)-1-pyrrolidinyl]-p-fluorobutyrophenone | 2 | M.P. of the naphthalene-1,5-disulphonate form: 217 to 219° (from ethanol) |
| | Starting material:<br>a) 3-(3,4-dichlorophenyl)-3-cyano-glutaric acid diethyl ester | 1c | M.P. 65° (from ether/petroleum ether) |
| | b) 3-(3,4-dichlorophenyl)-5-oxo-3-pyrrolidine-acetic acid ethyl ester | 1d | M.P. 91 to 93° |
| | c) 3-(3,4-dichlorophenyl)-3-2-(hydroxyethyl)pyrrolidine | 1f | crude product used as such for next reaction |
| 17 | p-fluoro-4-[3-(2-methoxyethyl)-3-(3,4-dimethoxyphenyl)-1-pyrrolidinyl]-butyrophenone | 3 | M.P. of the trishydrogen fumarate form: 127–130° (from ethanol) |
| | Starting materials:<br>a) 3-cyano-3-(3,4-dimethoxphenyl)-5-methoxy-pentanoic acid ethyl ester | 1c | B.P. 176 to 180° at 0.05 mm of Hg |
| | b) 3- (3,4-dimethoxphenyl)-3-(2-methoxyethyl)-5-oxopyrrolidine | 1d | yellow oil, used for next reaction in crude state |
| | c) 3-(3,4-dimethoxyphenyl)-3-(2-methoxyethyl)pyrrolidine | 1f | used for next reaction in crude state |

EXAMPLE 18:

4-[3-(2-hydroxyethyl)-3-phenyl-1-pyrrolidinyl]butyrophenone [process variant a)] 8 g of 3-(2-hydroxyethyl)-3-phenylpyrrolidine and 9.2 g of 4-chlorobutyrophenone are heated at 100° for 5 hours, while stirring, together with 9 g of sodium carbonate in 100 cc of dimethyl formamide, and the reaction mixture is worked up as described in Example 1. The resulting crude title compound is converted into its 1,5-naphthalenedisulphonate form, M.P. 168°–170° (from ethanol).

EXAMPLE 19:

p-Chloro-4-[3-(p-chlorophenyl)-3-(2-hydroxyethyl)-1-pyrrolidinyl]butyrophenone [process variant a)] 10 g of 3-p-chlorophenyl-3-hydroxymethylpyrrolidine, 11.6 g of 4,4'-dichlorobutyrophenone, 9.5 g of sodium carbonate and 0.1 g of sodium iodide are stirred at 100° in 100 cc of dimethyl formamide for 5 hours. Filtration is subsequently effected and the filtrate is concentrated by evaporation. The oily residue is stirred at 20° together with 120 cc of 20 percent hydrochloric acid for one hour. The acid solution is washed with 50 cc of chloroform, is then rendered alkaline with a 2N caustic soda solution and is extracted twice with 50 cc amounts of chloroform. The crude title compound, obtained after concentrating the chloroform phase which has been dried over sodium sulphate, is converted into its hydrochloride form. M.P. 155°–158° (from ethanol).

EXAMPLE 20:

4-[3-ethoxymethyl)-3-phenyl-1-pyrrolidinyl]-p-fluorobutyrophenone [process variants a) and c)] 13.2 g of 3-ethoxymethyl-3-phenylpyrrolidine and 20 g of 2-(3-chloropropyl)-2-(p-fluorophenyl)-1,3-dioxolane are stirred at 100° for 5 hours together with 15 g of sodium carbonate in 200 cc of dimethyl formamide. The reaction mixture is subsequently worked up as described in Example 3. After concentrating the chloroform phase by evaporation, the title compound is obtained as viscous, light yellow oil. Analysis: calculated F 5.1 % N 3.8 % found 5.3 % 3.5 %

The starting material is produced as follows:

a. 21 g of 3-hydroxymethyl-3-phenylpyrrolidine and 15 g of benzyl bromide are stirred at 80° for 12 hours together with 20 g of sodium carbonate in 200 cc of dimethyl formamide. Filtration is then effected and the filtrate is concentrated by evaporation. Purification is effected by dissolving the residue in 200 cc of chloroform, extracting with 75 cc of 2N hydrochloric acid, again rendering the hydrochloric acid extract alkaline and again extracting with 100 cc of chloroform. The extract is dried over sodium sulphate and concentrated by evaporation. The residue is dissolved in 100 cc of dimethyl formamide, 15 g of pyridine are added, and 11 g of methanesulphochloride are added dropwise at 5°–10° while cooling and stirring. The mixture is stirred at 40° for a further 40 minutes, is then poured on ice and extracted twice with 100 cc amounts of chloroform. The chloroform extracts are dried with sodium sulphate, concentration by evaporation is effected, the residue is dissolved in 50 cc of dimethyl formamide and stirring is effected at 90° for 3 hours with 4 g of potassium ethylate. The reaction mixture is subsequently concentrated by evaporation, the residue is divided between chloroform and water, the chloroform phase is separated and the solvent is removed by distillation after drying over sodium sulphate. The resulting 3-ethoxymethyl-1-benzyl-3-phenylpyrrolidine is dissolved in 200 cc of ethanol and hydrogenation is effected with palladium/charcoal at 50° and a hydrogen pressure of 81 atmospheres. After removing the catalyst by filtration and removing the solvent by distillation, 3-ethoxy-3-phenylpyrrolidine is obtained as a light oil, which is sufficiently pure for the next reaction.

EXAMPLE 21:

4-[3-(2-acetoxyethyl)-3-phenyl-1-pyrrolidinyl]-p-fluorobutyrophenone [process variant a)] 3-(2-acetoxyethyl)-3-phenylpyrrolidine is reacted in a manner analogous to that described Example 1, with 4-chloro-p-fluorobutyrophenone. The crude title compound, obtained as an oil, is converted into its hydrogen fumarate form with fumaric acid and is recrystallized from ethanol/ether. M.P. 152°–153°.

The starting material may be obtained as follows:

a. 10 g of 3-(2-hydroxyethyl)-3-phenylpyrrolidine are dissolved in a mixture of 50 cc of dimethyl formamide and 50 cc of toluene, and 15 g of sodium carbonate are added. 10 g of benzyl bromide in 20 cc of toluene are then added dropwise and the reaction mixture is heated to 100° for 3 hours. After the reaction is complete, cooling and filtration are effected and the solvent is then removed by evaporation. The resulting oily 1-benzyl-3-(2-hydroxyethyl)-3-phenylpyrrolidine is used in crude state for the next reaction.

b. 15 g of crude 1-benzyl-3-(2-hydroxyethyl)-3-phenylpyrrolidine are stirred at room temperature together with 7.5 g of pyridine and 7.5 g of acetic anhydride for 20 hours. The reaction mixture is then poured on ice and rendered alkaline with a 2N caustic soda solution. Extraction is effected thrice with 50 cc amounts of ether. The combined ether extracts are dried over sodium sulphate and concentrated by evaporation. The resulting crude 3-(2-acetoxyethyl)-1-benzyl-3-phenylpyrrolidine, obtained as an oil, is used as such for the next reaction.

c. 10 g of crude 3-(2-acetoxyethyl)-1-benzyl-3-phenylpyrrolidine are dissolved in 100 cc of ethanol, and a palladium catalyst (10 percent on charcoal) is added. Hydrogenation is subsequently effected at 50° and a hydrogen pressure of 101 atmospheres for 12 hours. Filtration and concentration by evaporation are then effected. The resulting 3-(2-acetoxyethyl)-3-phenylpyrrolidine, obtained as a yellow oil, is used in crude state for the next reaction.

EXAMPLE 22:

4-(3-p-chlorophenyl-3-methylcarbamoyloxymethyl-1-pyrrolidinyl)-p-fluorobutyrophenone [process variants a) and e)] 9.3 g of 3-p-chlorophenyl-3-methylcarbamoyloxymethyl-pyrrolidine, 11.5 g of 2-(3-chloropropyl)-2-p-fluorophenyl-1,3-dioxolane, 8.5 g of sodium carbonate and 0.1 g of sodium iodide are stirred in 60 cc of dimethyl formamide at 120° for 12 hours. Filtration is subsequently effected and the filtrate is concentrated by evaporation. The oily residue is stirred at 20° for one hour together with 120 cc of 20 percent hydrochloric acid; the acid solution is washed with 50 cc of chloroform, is then rendered alkaline with a 2N caustic soda solution and is extracted twice with 50 cc amounts of chloroform. The title compound obtained after concentrating the chloroform phase which has been dried over sodium sulphate, is converted into its naphthalene-1,5-disulphonate form with 1,5-naphthalene-disulphonic acid. M.P. 186°–187°.

The starting material is produced as follows:

21 g of 3-p-chlorophenyl-3-hydroxymethylpyrrolidine and 17 g of benzyl bromide are stirred at 80° for 12 hours together with 20 g of sodium carbonate in 200 cc of dimethyl formamide. Filtration is then effected and the filtrate is concentrated by evaporation. Purification is effected by dissolving the residue in 200 cc of chloroform, extracting with 75 cc of 2N hydrochloric acid, rendering the hydrochloric acid extract alkaline and again extracting with 100 cc of chloroform. 6.0 g of methyl isocyanate are added to the dried chloroform extract and the mixture is allowed to stand at room temperature for 18 hours. The solvent is then removed by distillation and the resulting oily 1-benzyl-3-p-chlorophenyl-3-methylcarbamoyloxymethylpyrrolidine is hydrogenated in 200 cc of ethanol with palladium/charcoal at 50° and a hydrogen pressure of 76 atmospheres. After removing the catalyst by filtration and removing the solvent by distillation, 3-p-chlorophenyl-3-methylcarbamoyloxymethylpyrrolidine is obtained as light-coloured oil.

EXAMPLE 23:

2-[3-(3-p-chlorophenyl-3-hydroxymethyl-1-pyrrolidinyl)propyl]-2-(p-fluorophenyl)-1,3-dioxolane [process variant a)] 8.5 g of 3-p-chlorophenyl-3-hydroxymethylpyrrolidine, 11.2 g of 2-(3-chloropropyl-2-(p-fluorophenyl)-1,3-dioxolane, 8.5 g of sodium carbonate and 0.1 g of sodium iodide are stirred at 120° in 60 cc of dimethyl formamide for 12 hours. Filtration is subsequently effected and the filtrate is concentrated by evaporation. The title compound, obtained as an oil, is purified by chromatography.

| Analysis: | % C | % H | % N | % F |
|---|---|---|---|---|
| calculated: | 65.9 | 6.5 | 3.3 | 4.5 |
| found: | 65.5 | 6.5 | 3.1 | 4.2 |

The naphthalene-1,5-disulphonate form of the 4-[3-(p-chlorophenyl)-3-hydroxymethyl-1-pyrrolidinyl]-p-fluorobutyrophenone obtained by hydrolysis of the ketal group of the title compound, has a M.P. of 200° to 202° (from ethanol).

Hydrolysis is effected by stirring the title compound with 120 cc of 20% hydrochloric acid at 20° for 1 hour. The reaction mixture is then rendered alkaline with a 2N caustic soda solution and extraction is effected with chloroform. The 4-[3-(p-chlorophenyl)-3-hydroxymethyl-1-pyrrolidinyl]-p-fluorobutyrophenone, obtained after concentrating the chloroform phase, is then converted into its naphthalene-1,5-disulphonate form.

The following compounds of formula Ii are also obtained in a manner analogous to that described in Example 23, by reacting the corresponding compound of formula II with 2-(3-chloropropyl)-2-(p-fluorophenyl)-1,3-dioxolane, and are characterized by the butyrophenone derivative obtained by hydrolysis of the compound:

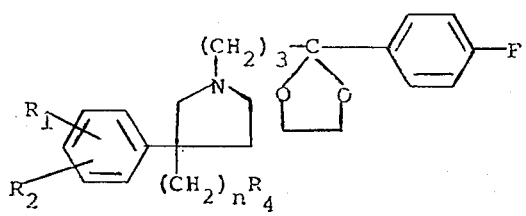

Ii

After standing at room temperature for 12 hours, the mixture is poured on ice, is rendered alkaline with a 2N caustic soda solution and is extracted twice with 100 cc of amounts of ether. The combined ether extracts are dried over sodium sulphate and concentrated by evaporation. The resulting crude title compound is converted into its naphthalene-1,5-disulphonate form with

| Example No. | $R_1$ | $R_2$ | $R_4$ | n | % C | % H (Analysis+) % N | | % F | Butyrophenone derivative |
|---|---|---|---|---|---|---|---|---|---|
| 24 | 4-Cl | H | OH | 2 | 66,3 (66,6) | 6,6 (6,7) | 3,1 (3,2) | 4,0 (4,4) | M.P. of the naphthalene-1,5-disulphonate 195–197° (from methanol) |
| 25 | H | H | OH | 1 | 71,2 (71,4) | 7,2 (7,3) | 3,3 (3,6) | 4,7 (4,9) | M.P. of the hydrogen fumarate 149–151° |
| 26 | H | H | $OCH_3$ | 2 | 72,7 (72,5) | 8,0 (7,8) | 3,1 (3,4) | 4,5 (4,6) | M.P. of the naphthalene-1,5-disulphonate 179–181° |
| 27 | 4-iso-propyl | H | OH | 2 | 73,6 (73,4) | 8,3 (8,2) | 3,1 (3,2) | 4,0 (4,3) | M.P. of the naphthalene-1,5-disulphonate 148–149° (from ethanol) |
| 28 | 3-$OCH_3$ | H | OH | 2 | 70,2 (70,0) | 7,4 (7,5) | 3,1 (3,3) | 3,9 (4,4) | M.P. of the naphthalene-1,5-disulphonate 169–171° (from ethanol) |
| 29 | 4-$OCH_3$ | H | OH | 2 | 69,7 (70,0) | 7,3 (7,5) | 3,5 (3,3) | 4,1 (4,4) | M.P. of the naphthalene-1,5-disulphonate 168–169° (from ethanol) |
| 30 | 3,4-methylene-dioxy | | OH | 2 | 67,9 (67,8) | 6,8 (6,8) | 3,1 (3,2) | 4,0 (4,3) | M.P. of the naphthalene-1,5-disulphonate 158–159° (from ethanol) |
| 31 | 2-$OCH_3$ | 4-$OCH_3$ | OH | 2 | 68,1 (68,4) | 7,2 (7,3) | 3,0 (3,2) | 4,1 (3,8) | M.P. of the naphthalene-1,5-disulphonate 170–172° (from ethanol) |
| 32 | 4-F | H | OH | 2 | 69,4 (69,0) | 7,2 (7,0) | 3,3 (3,3) | 8,7 (9,1) | M.P. of the naphthalene-1,5-disulphonate 184–185° (from ethanol) |
| 33 | 4-$CH_3$ | H | OH | 2 | 72,6 (72,8) | 7,7 (7,8) | 3,5 (3,4) | 4,2 (4,6) | M.P. of the naphthalene-1,5-disulphonate 210–211° (from ethanol) |
| 34 | 4-Cl | H | $OCH_3$ | 2 | 67,6 (67,1) | 6,8 (6,9) | 3,1 (3,1) | 4,0 (4,2) | M.P. of the naphthalene-1,5-disulphonate 203–205° |
| 35 | 4-Cl | H | $OCOCH_3$ | 2 | 66,3 (66,8) | 6,1 (6,3) | 3,1 (3,2) | 4,0 (4,4) | M.P. of the tris-hydrogen fumarate 156–157° |
| 36 | 4-Cl | H | $OCONHCH_3$ | 1 | 64,9 (65,2) | 6,7 (6,6) | 5,9 (6,1) | 3,8 (4,1) | M.P. of the naphthalene-1,5-disulphonate 186–187° |

+) Calculated values in brackets.

EXAMPLE 37:

4-(3-acetoxymethyl-3-phenyl-1-pyrrolidinyl)-p-fluorobutyrophenone [process variant b)] 18.2 g of p-fluoro-4-(3-hydroxymethyl-3-phenyl-1-pyrrolidinyl)butyrophenone are dissolved in a mixture of 20 cc of pyridine and 20 cc of acetic anhydride.

naphthalene-1,5-disulphonic acid. M.P. 200° to 202° (from ethanol/ether).

The following compounds are also produced in a manner analogous to that described in Example 37 from the corresponding 4-(3-acyloxyalkyl)-3-phenyl-1-pyrrolidinyl)butyrophenone derivatives and the corresponding acid anhydrides.

| Example No. | Compound | Remarks |
|---|---|---|
| 38 | 4-[3-(2-acetoxyethyl)-3-phenyl-1-pyrrolidinyl]-p-fluorobutyrophenone | M.P. of the hydrogen fumarate 152–153° (from ethanol/ether) |
| 39 | p-fluoro-4-[3-phenyl-3-(2-propionyl-oxyethyl)-1-pyrrolidinyl]butyrophenone | M.P. of the hydrogen fumarate 153–154° (from ethanol/ether) |
| 40 | p-fluoro-4-[3-phenyl-3-(2-pivaloyl-oxyethyl)-1-pyrrolidinyl]butyrophenone | M.P. of the hydrogen fumarate 164–165° (from ethanol/ether |
| 41 | 4-[3-(2-acetoxyethyl)-3-(p-tolyl)-1-pyrrolidinyl]-p-fluorobutyrophenone | M.P. of the bis[base]-tris-hydrogen fumarate 158–159° (from ethanol) |
| 42 | p-fluoro-4-[3-(p-methoxyphenyl)-3-(2-propionyloxyethyl)-1-pyrrolidinyl]-butyrophenone | M.P. of the bis[base]-tris-hydrogen fumarate 138–139° (from ethanol) |
| 43 | 4-[3-(2-acetoxyethyl)-3-(2,4-dimethoxy-phenyl)-1-pyrrolidinyl]-p-fluorobutyro-phenone | Glacial acetic acid was used in place of acetic anhydride. M.P. of the tris-hydrogen fumarate 141–142° (from ethanol) |
| 44 | 4-[3-(2-acetoxyethyl)-3-p-chlorophenyl-1-pyrrolidinyl]-p-fluorobutyrophenone | M.P. of the bis[base]-tris-hydrogen fumarate 156–157° (from ethanol) |
| 45 | 4-[3-p-chlorophenyl-3-(2-propionyloxy-ethyl)-1-pyrrolidinyl]-p-fluorobutyro-phenone | M.P. of the bis[base]-tris-hydrogen fumarate 153–154° (from ethanol) |
| 46 | p-fluoro-4-[3-(2-propionyloxyethyl)-3-(3,4,5-trimethoxyphenyl)-1-pyrrolidinyl]butyrophenone | Reaction time 20 hours. M.P. of the bis[base]-tris-hydrogen fumarate 154–156° (from ethanol |
| 47 | 4-[3-(3,4-dimethoxyphenyl)-3-(2-propionyl-oxyethyl)-1-pyrrolidinyl]-p-fluoro-butyrophenone | Reaction time 20 hours. M.P. of the bis[base]-tris-hydrogen fumarate 139–141° (from ethanol) |
| 48 | 4-[3-(p-chlorophenyl)-3-(2-pivaloyloxy-ethyl)-1-pyrrolidinyl]-p-fluorobutyro-phenone | M.P. of the bis[base]-tris-hydrogen fumarate 115–117° (from ethanol) |

EXAMPLE 49:

4-(3-p-chlorophenyl-3-methylcarbamoyloxymethyl-1-pyrrolidinyl)-p-fluorobutyrophenone [process variant b)] 5 g of 4-(3-p-chlorophenyl-3-hydroxymethyl-1-pyrrolidinyl)-p-fluorobutyropheone and 1.4 g of methyl isocyanate are allowed to stand at room temperature in 50 cc of methylene chloride for 18 hours. The solvent is then removed by distillation, and the resulting oily title compound is converted into its naphthalene-1,5-disulphonate form with naphthalene-1,5-disulphonic acid. M.P. 186°–187°.

EXAMPLE 50:

4-[3-(2-hydroxyethyl)-3-phenyl-1-pyrrolidinyl]-p-fluorobutyrophenone [process variant c)] 10 g of 1-p-fluorophenyl-4-[3-(2-hydroxyethyl)-3-phenyl-1-pyrrolidinyl]-1-butanol are boiled at reflux for 72 hours together with 2.5 g of aluminium isopropylate in a solution of 100 cc of acetone and 400 cc of benzene. After cooling the solution, thorough shaking is effected with 100 cc of a 2N caustic soda solution, the benzene phase is separated and the alkaline, aqueous phase is extracted thrice with 50 cc amounts of chloroform. The organic phases are combined, dried over magnesium sulphate and concentrated by evaporation. The crude title compound is obtained as clear, yellow oil and is converted into its 1,5-naphthalene-disulphonate form with 1,5-naphthalenedisulphonic acid. After recrystallization from ethanol to 1,5-naphthalenedisulphonate of the title compound has a M.P. of 169°–171°.

Production of the starting material:
a. 7.0 g of 4-chloro-1-p-fluorophenyl-1-butanol and 6.5 g of 3-(2-hydroxyethyl)-3-phenylpyrrolidine are boiled at reflux together with 6.5 g of sodium carbonate in 100 cc of toluene, while stirring, for 6 hours. Filtration is then effected, the solvent is removed by evaporation and the oily residue is taken up in 100 cc of 2N hydrochloric acid. The acid solution is washed twice with 50 cc amounts of chloroform, is then rendered alkaline with a 2N caustic soda solution while cooling and is extracted thrice with 50 cc amounts of chloroform. The extract is dried over magnesium sulphate and concentrated by evaporation. The resulting crude 1-p-fluorophenyl-4-[3-(2-hydroxyethyl)-3-phenyl-1-pyrrolidinyl]-1-butanol is used as such for the next reaction.

EXAMPLE 51:

p-Fluoro-4-[3-(2-methoxyethyl)-3-phenyl-1-pyrrolidinyl]butyrophenone 10 g of 1-p-fluorophenyl-4-[3-(2-methoxyethyl)-3-phenyl-1-pyrrolidinyl]-1-butanol are dissolved in chloroform and 12 g of manganese dioxide are added. The mixture is then boiled at reflux for 24 hours, the manganese dioxide is filtered off and the clear chloroform solution is concentrated by evaporation. The crude title compound is obtained as yellow oil and is converted into its naphthalene-1,5-disulphonate form with naphthalene-1,5-disulphonic acid. After recrystallization from ethanol the naphthalene-1,5-disulphonate of the title compound has a M.P. of 179°–181°.

Production of the starting material:

15 g of 3-(2-methoxyethyl)-3-phenylpyrrolidine are boiled at reflux together with 16 g of 4-chloro-1-p-fluorphenyl-1-butanol and 20 g of sodium carbonate in 150 cc of toluene, while stirring, for 6 hours, and the crude 1-p-fluorophenyl-4-[3-(2-methoxyethyl)-3-phenyl-1-pyrrolidinyl]-1-butanol is worked up as described in Example 50 a).

EXAMPLE 52:

p-Fluoro-4-[3-(p-methoxyphenyl)-3-(2-propionyloxyethyl)-1-pyrrolidinyl]-butyrophenone 12 g of crude 1-p-fluorophenyl-4-[3-p-methoxyphenyl-3-(2-propionyloxyethyl)-1-pyrrolidinyl]-1-butanol are stirred overnight at 20° together with 6 g of chromic acid in 100 cc of pyridine. Filtration is then effected and the pyridine is removed to a great extent; the resulting dark oil is taken up in chloroform and extracted thrice with 100 cc amounts of cold 2N hydrochloric acid. The reaction mixture is then washed with sodium carbonate solution and water, is dried over magnesium sulphate and concentrated by evaporation. A solution of fumaric acid in ethanol is added to the resulting dark oil. The trishydrogen fumarate of the title compound is obtained which, after recrystallization from ethanol, has a M.P. of 138°–139°.

The starting material is obtained as follows:
a. 1-benzyl-3-(2-hydroxyethyl-3-p-methoxyphenyl-pyrrolidine, produced in a manner analogous to that described in Example 21a); used for the next reaction in crude state.
b. 1-benzyl-3-p-methoxyphenyl-3-(2-propionyloxyethyl)pyrrolidine, produced in a manner analogous to that described in Example 21b), from 60 g of the product described above and 120 g of propionic acid anhydride; used for the next reaction in crude state.
c. 3-p-methoxyphenyl-3-(2-propionyloxyethyl)-pyrrolidine, produced in a manner analogous to that described in Example 21c); used for the next reaction in crude state.
d. 1-p-fluorophenyl-4-[3-p-methoxyphenyl-3-(2-propionyloxyethyl)-1-pyrrolidinyl]-1-butanol produced in a manner analogous to that described in Example 50 a); used for the next reaction in crude state.

The following butyrophenone derivatives are also obtained in a manner analogous to that described in Example 50 by oxidation of the corresponding 1-phenyl-1-butanol derivatives:

| Example No. | Compound | Physical constants, remarks |
|---|---|---|
| 53 | 4-(3-p-chlorophenyl-3-hydroxymethyl-1-pyrrolidinyl)-p-fluorobutyrophenone | M.P. of the naphthalene-1,5-disulphonate 200–202° (from ethanol) |
| 54 | 4-[3-p-chlorophenyl-3-(2-hydroxyethyl)-1-pyrrolidinyl]-p-fluorobutyrophenone | M.P. of the naphthalene-1,5-disulphonate 195–197° (from ethanol) |
| 55 | p-fluoro-4-[3-hydroxymethyl-3-phenyl-1-pyrrolidinyl]butyrophenone | M.P. of the hydrogen fumarate 149–151° |
| 56 | p-fluoro-4-[3-(2-methoxyethyl)-3-phenyl-1-pyrrolidinyl]butyrophenone | M.P. of the naphthalene-1,5-disulphonate 179–181° |
| 57 | p-fluoro-4-[3-(2-hydroxyethyl)-3-(p-isopropylphenyl)-1-pyrrolidinyl]-butyrophenone | M.P. of the naphthalene-1,5-disulphonate 148–149° (from ethanol) |

—Continued

| Example No. | Compound | Physical constants, remarks |
|---|---|---|
| 58 | p-fluoro-4-[3-(2-hydroxyethyl)-3-(m-methoxyphenyl)-1-pyrrolidinyl]-butyrophenone | M.P. of the naphthalene-1,5-disulphonate 169–171° (from ethanol) |
| 59 | p-fluoro-4-[3-(2-hydroxyethyl)-3-(p-methoxyphenyl)-1-pyrrolidinyl]-butyrophenone | M.P. of the naphthalene-1,5-disulphonate 168–169° (from ethanol) |
| 60 | p-fluoro-[3-(2-hydroxyethyl)-3-(2,4-dimethoxyphenyl)-1-pyrrolidinyl]-butyrophenone | M.P. of the naphthalene-1,5-disulphonate 170–172° (from ethanol) |
| 61 | 4-fluoro-[3-(p-fluorophenyl)-3-(2-hydroxyethyl)-1-pyrrolidinyl]butyrophenone | M.P. of the naphthalene-1,5-disulphonate 184–185° (from ethanol) |
| 62 | p-fluoro-4-[3-(2-hydroxyethyl)-3-(p-tolyl)-1-pyrrolidinyl]butyrophenone | M.P. of the naphthalene-1,5-disulphonate 210–211° (from ethanol) |
| 63 | 4-[3-p-chlorophenyl-3-(2-methoxyethyl)-1-pyrrolidinyl]-p-fluorobutyrophenone | M.P. of the naphthalene-1,5-disulphonate 203–205° |
| 64 | p-fluoro-4-[3-(2-hydroxyethyl)-3-(3,4,5-trimethoxyphenyl)-1-pyrrolidinyl]-butyrophenone | Chromatographical purification on silica gel<br>Analysis %C %H %F %N<br>Calculated 67.4 7.2 4.3 3.1<br>Found 67.9 7.1 3.9 3.0 |
| 65 | p-fluoro-4-[3-(2-hydroxyethyl)-3-(3,4-dimethoxyphenyl)-1-pyrrolidinyl]-butyrophenone | Light yellow oil purified chromatographically on silica gel (eluant: ether/petroleum ether 1:1)<br>Analysis %C %H %F %N<br>Calculated 69.5 7.2 4.6 3.4<br>Found 69.7 7.1 4.2 3.4 |
| 66 | 4-[3-(3,4-dichlorophenyl)-3-(2-hydroxyethyl)-1-pyrrolidinyl]-p-fluorobutyrophenone | M.P. of the naphthalene-1,5-disulphonate 217–219° (from ethanol) |
| 67 | p-fluoro-4-[3-(2-methoxyethyl)-3-(3,4-dimethoxyphenyl)-1-pyrrolidinyl]-butyrophenone | M.P. of the naphthalene-1,5-disulphonate 158–159° (from ethanol) |
| 68 | 4-(3-p-chlorophenyl-3-methylcarbamoyloxymethyl-1-pyrrolidinyl)-p-fluoro-butyrophenone | M.P. of the naphthalene-1,5-disulphonate 186–187° (from ethanol) |
| 69 | p-fluoro-4-[3-(2-hydroxyethyl)-3-(3,4-methylenedioxyphenyl)-1-pyrrolidinyl]-butyrophenone | M.P. of the naphthalene-1,5-disulphonate 158–159° (from ethanol) |

EXAMPLE 70:

p-Fluoro-4-(3-methoxymethyl-3-phenyl-1-pyrrolidinyl)butyrophenone [process variant a)]

12 g of 3-methoxymethyl-3-phenylpyrrolidine and 20 g of 2-(3-chloropropyl)-2-(p-fluorophenyl)-1,3-dioxolane are reacted in accordance with the process described in Example 20 and the title compound is obtained as light-coloured oil.

| Analysis | % F | % N |
|---|---|---|
| calculated: | 5.3 | 3.9 |
| found: | 4.9 | 4.1 |

The starting material is obtained by using sodium methylate in place of potassium ethylate in the process described in Example 20 a).

EXAMPLE 71:

4-(3-ethoxymethyl-3-phenyl-1-pyrrolidinyl)-p-fluorobutyrophenone [process variant d)]

31 g of p-fluoro-4-(3-hydroxymethyl-3-phenyl-1-pyrrolidinyl)butyrophenone and 16.5 g of pyridine are dissolved in 100 cc of dimethyl formamide. 12.6 g of methanesulphochloride are added dropwise at 0°–10°, while stirring and cooling. Stirring is effected at room temperature for one hour and at 40° for 30 minutes, and the mixture is then poured on ice. The product is isolated by extracting thrice with 100 cc amounts of chloroform, drying over sodium sulphate and concentrating by evaporation. The resulting p-fluoro-4-(3-mesyloxymethyl-3-phenyl-1-pyrrolidinyl)butyrophenone is converted into the hydrogen fumarate form. M.P. 139° – 140°.

9.0 g of p-fluoro-4-(3-mexyloxymethyl-3-phenyl-1-pyrrolidinyl)butyrophenone are heated to 90°–100° together with a solution of 2 g of potassium ethylate in 50 cc of dimethyl formamide, while stirring, for 3 hours. The reaction solution is subsequently concentrated by devaporation and the residue is divided between chloroform and water. The chloroform phase is separated and dried over sodium sulphate. After removing the solvent by distillation, the title compound is obtained as viscous, light yellow oil.

| Analysis | % F | % N |
|---|---|---|
| calculated: | 5.1 | 3.8 |
| found: | 5.0 | 4.1 |

EXAMPLE 72:

p-Fluoro-4-(3-methoxymethyl-3-phenyl-1-pyrrolidinyl)butyrophenone

The title compound is obtained as an oil in accordance with the process described in Example 71, by using 1.3 g of sodium methylate in place of 2 g of potassium ethylate.

| Analysis | % F | % N |
|---|---|---|
| calculated: | 5.3 | 3.9 |
| found: | 5.1 | 4.2 |

Using the process exemplified in Example 23 and the appropriate starting materials, there is obtained:

EXAMPLE 73:

p-fluoro-4-[3-(2-hydroxyethyl)-3-(3,4,5-trimethyl phenyl)-1-pyrrolidinyl]butyrophenone-1,3-dioxane.

EXAMPLE 74:

p-fluoro-4-[3-bromophenyl-3-(hydroxyethyl)-1-pyrrolidinyl] butyrophenone-1,3-dioxane.

Specific example of daily dosages at which satisfactory results are obtained of the compounds as analgesic agents are:-

| Title compound of Example | Dosage A mg/kg (p.o.) | Dosage B mg (p.o.) |
|---|---|---|
| 1 | 0.5 – 30 e.g. 8 – 15 | 30 – 300 |
| 2 | 0.5 – 30 e.g. 8 – 15 | 30 – 300 |
| 3 | 0.5 – 30 e.g. 8 – 15 | 30 – 300 |
| 11 | 0.5 to 30 e.g. 4 | 30 – 300 |
| 12 | 0.5 to 30 e.g. 12 | 30 – 300 |
| 9 | 0.5 to 30 | 30 – 300 |
| 10 | 0.5 to 30 | 30 – 300 |
| 8 | 0.5 to 30 | 30 – 300 |
| 7 | 0.5 to 30 | 30 – 300 |
| 6 | 0.5 to 30 | 30 – 300 |
| 38 | 0.5 to 30 e.g. 10 – 30 | 30 – 300 |
| 39 | 0.5 to 30 e.g. 10 – 30 | 30 – 300 |
| 40 | 0.5 to 30 e.g. 10 – 30 | 30 – 300 |

Dosage A is for animals in general, e.g. a mouse in mg/kg animal body weight of the compound; and
Dosage B is for the larger mammals.

What is claimed is:

1. A compound of the formula,

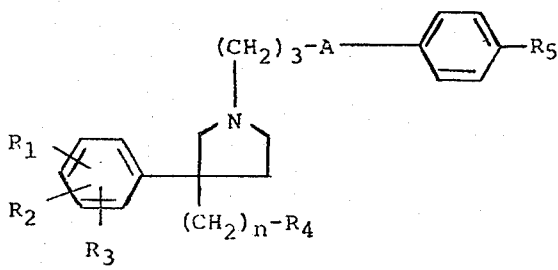

wherein
- $R_1$ is hydrogen, lower alkyl, halogen, of atomic number from 9 to 35, or lower alkoxy, and
- $R_2$ is hydrogen, lower alkyl, chlorine or lower alkoxy, or
- $R_1$ and $R_2$ together are methylenedioxy,
- $R_3$ is hydrogen, lower alkyl or lower alkoxy,
- $n$ is 1 or 2,
- $R_4$ is hydroxyl, lower alkoxy, lower alkylcarboxy, or, when $n$ is 1, alternatively lower monoalkylcarbamoyloxy,
- $R_5$ is hydrogen, fluorine or chlorine, and
- A is carbonyl, or a pharmaceutically acceptable acid addition salt thereof.

2. A compound of claim 1, wherein A is carbonyl.

3. The compound of claim 2 which is p-fluoro-4-[3-(2-hydroxyethyl)-3-phenyl-1-pyrrolidinyl]-butyrophenone.

4. The compound of claim 2 which is 4-(3-p-chlorophenyl-3-hydroxymethyl-1-pyrrolidinyl)-p-fluorobutyrophenone.

5. The compound of claim 2 which is 4-[3-p-chlorophenyl-3-(2-hydroxyethyl)pyrrolidin-1-yl]-p-fluorobutyrophenone.

6. The compound of claim 2 which is p-fluoro-4-(3-hydroxymethyl-3-phenyl-1-pyrrolidinyl)-butyrophenone.

7. The compound of claim 2 which is p-fluoro-4-[3-(2-methoxyethyl)-3-phenyl-1-pyrrolidinyl]-butyrophenone.

8. The compound of claim 2 which is p-fluoro-4-[3-(2-hydroxyethyl)-3-(p-isopropylphenyl)-1-pyrrolidinyl]butyrophenone.

9. The compound of claim 2 which is p-fluoro-4-[3-(2-hydroxyethyl)-3-(m-methoxyphenyl)-1-pyrrolidinyl]butyrophenone.

10. The compound of claim 2 which is p-fluoro-4-[3-(2-hydroxyethyl)-3-(p-methoxyphenyl)-1-pyrrolidinyl]butyrophenone.

11. The compound of claim 2 which is p-fluoro-4-[3-(2-hydroxyethyl)-3-(3,4-methylenedioxyphenyl)-1-pyrrolidinyl]butyrophenone.

12. The compound of claim 2 which is p-fluoro-[3-(2-hydroxyethyl)-3-(2,4-dimethoxyphenyl)-1-pyrrolidinyl]butyrophenone.

13. The compound of claim 2 which is p-fluoro-4-[3-(p-fluorophenyl)-3-(2-hydroxyethyl)-1-pyrrolidinyl]butyrophenone.

14. The compound of claim 2 which is p-fluoro-4-[3-(2-hydroxyethyl)-3-(p-tolyl)-1-pyrrolidinyl]-butyrophenone.

15. The compound of claim 2 which is 4-[3-p-chlorophenyl-3-(2-methoxyethyl)-1-pyrrolidinyl]-p-fluorobutyrophenone.

16. The compound of claim 2 which is p-fluoro-4-[3-(2-hydroxyethyl)-3-(3,4,5-trimethoxyphenyl]-1-pyrrolidinylbutyrophenone.

17. The compound of claim 2 which is p-fluoro-4-[3-(2-hydroxyethyl)-3-(3,4-dimethoxyphenyl)-1-pyrrolidinyl]butyrophenone.

18. The compound of claim 2 which is 4-[3-(3,4-dichlorophenyl)-3-(2-hydroxyethyl)-1-pyrrolidinyl]-p-fluorobutyrophenone.

19. The compound of claim 2 which is p-fluoro-4-[3-(2-methoxyethyl)-3-(3,4-dimethoxyphenyl)-1-pyrrolidinyl]butyrophenone.

20. The compound of claim 2 which is 4-[3-(2-hydroxyethyl)-3-phenyl-1-pyrrolidinyl]-butyrophenone.

21. The compound of claim 2 which is p-chloro-4-[3-(p-chlorophenyl)-3-(2-hydroxyethyl)-1-pyrrolidinyl]butyrophenone.

22. The compound of claim 2 which is 4-[3-ethoxymethyl)-3-phenyl-1-pyrrolidinyl]-p-fluoro-butyrophenone.

23. The compound of claim 2 which is 4-[3-(2-acetoxyethyl)-3-phenyl-1-pyrrolidinyl]-p-fluorobutyrophenone.

24. The compound of claim 2 which is 4-(3-p-chlorophenyl-3-methylcarbamoyloxymethyl-1-pyrrolidinyl)-p-fluorobutyrophenone.

25. The compound of claim 2 which is 4-(3-acetoxymethyl-3-phenyl-1-pyrrolidinyl)-p-fluorobutyrophenone.

26. The compound of claim 2 which is p-fluoro-4-[3-phenyl-3-(2-propionyloxyethyl)-1-pyrrolidinyl]butyrophenone.

27. The compound of claim 2 which is p-fluoro-4-[3-phenyl-3-(2-pivaloyloxyethyl)-1-pyrrolidinyl]butyrophenone.

28. The compound of claim 2 which is 4-[3-(2-acetoxyethyl)-3-(p-tolyl)-1-pyrrolidinyl]-p-fluorobutyrophenone.

29. The compound of claim 2 which is p-fluoro-4-[3-(p-methoxyphenyl)-3-(2-propionyloxyethyl)-1-pyrrolidinyl]butyrophenone.

30. The compound of claim 2 which is 4-[3-(2-acetoxyethyl)-3-(2,4-dimethoxyphenyl)-1-pyrrolidinyl]-p-fluorobutyrophenone.

31. The compound of claim 2 which is 4-[3-(2-acetoxyethyl)-3-p-chlorophenyl-1-pyrrolidinyl]-p-fluorobutyrophenone.

32. The compound of claim 2 which is 4-[3-p-chlorophenyl-3-(2-propionyloxyethyl)-1-pyrrolidinyl]-p-fluorobutyrophenone.

33. The compound of claim 2 which is p-fluoro-4-[3-(2-propionyloxyethyl)-3-(3,4,5-trimethoxyphenyl)-1-pyrrolidinyl]butyrophenone.

34. The compound of claim 2 which is 4-[3-(3,4-dimethoxyphenyl)-3-(2-propionyloxyethyl)-1-pyrrolidinyl]-p-fluorobutyrophenone.

35. The compound of claim 2 which is 4-[3-(p-chlorophenyl)-3-(2-pivaloyloxyethyl)-1-pyrrolidinyl]-p-fluorobutyrophenone.

36. The compound of claim 2 which is p-fluoro-4-(3-methoxymethyl-3-phenyl-1-pyrrolidinyl)-butyrophenone.

37. A compound according to claim 1, wherein in formula I $R_1$, $R_2$ and $R_3$, are, independently, of 1 to 3 carbon atoms when lower alkyl or alkoxy, and $R_4$ in the aggregate thereof is of 2 to 5 carbon atoms when lower alkylcarboxy or monoalkylcarbamoyloxy or of 1 to 3 carbon atoms when lower alkoxy.

38. A compound of claim 1, where $R_5$ is fluorine or chlorine.

39. A compound of claim 1, where $R_5$ is fluorine.

40. A compound of claim 1, where $n$ is 2.

* * * * *